United States Patent
Marchenko et al.

(10) Patent No.: US 8,494,556 B2
(45) Date of Patent: Jul. 23, 2013

(54) METHOD FOR CALIBRATING A PROPAGATION-TIME-BASED LOCALIZATION SYSTEM

(75) Inventors: Maksym Marchenko, München (DE); Alejandro Ramirez, München (DE); Christian Schwingenschlögl, Putzbrunn (DE)

(73) Assignee: Siemens Aktiengesellschaft, Munich (DE)

( * ) Notice: Subject to any disclaimer, the term of this patent is extended or adjusted under 35 U.S.C. 154(b) by 17 days.

(21) Appl. No.: 13/384,499

(22) PCT Filed: Jul. 16, 2010

(86) PCT No.: PCT/EP2010/060343
§ 371 (c)(1),
(2), (4) Date: Jan. 17, 2012

(87) PCT Pub. No.: WO2011/006998
PCT Pub. Date: Jan. 20, 2011

(65) Prior Publication Data
US 2012/0122484 A1    May 17, 2012

(30) Foreign Application Priority Data

Jul. 17, 2009    (DE) .......................... 10 2009 033 603

(51) Int. Cl.
*H04W 24/00* (2009.01)
(52) U.S. Cl.
USPC .................. 455/456.1; 455/456.2; 455/456.3; 455/456.4; 455/456.5; 455/457
(58) Field of Classification Search
USPC ..................... 455/456.1–456.6, 457
See application file for complete search history.

(56) References Cited

U.S. PATENT DOCUMENTS

| | | | |
|---|---|---|---|
| 7,880,673 B2 | 2/2011 | Hoshino et al. | 342/357.49 |
| 2003/0001777 A1 | 1/2003 | Johnson | 342/387 |

(Continued)

FOREIGN PATENT DOCUMENTS

| | | |
|---|---|---|
| CN | 101097254 A | 1/2008 |
| DE | 102006045350 A1 | 3/2007 |

(Continued)

OTHER PUBLICATIONS

Izpuierdo, F., et al., "Performance Evaluation of a TOA-based Trilateration Method to Locate Terminals in WLAN", Int'l Symposium on Wireless Pervasive Computing, pp. 1-6, Jan. 16, 2006.

(Continued)

*Primary Examiner* — Kiet Doan
*Assistant Examiner* — Dung Lam
(74) *Attorney, Agent, or Firm* — King & Spalding L.L.P.

(57) ABSTRACT

In a method for calibrating a propagation-time-based localization system in a computer-assisted manner, the position of a mobile object in a predetermined environment can be determined by detecting propagation-time-based variables of multiple base stations, wherein the propagation-time-based variable of a base station represents the propagation time of a signal between an object radio unit and the base station. The object is moved and the variables of the base stations are detected in the process at multiple measuring times. The minimum value of the variables of a base station is associated with a predefined minimum distance between the object and base station and the maximum value with a predefined maximum distance. A predefined dependence of the distances between the object and base station is scaled to the association of the minimum and maximum value. The scaled dependence is then used when determining the position of the mobile object.

20 Claims, 3 Drawing Sheets

U.S. PATENT DOCUMENTS

| | | | |
|---|---|---|---|
| 2010/0135178 A1* | 6/2010 | Aggarwal et al. | 370/252 |
| 2011/0045844 A1 | 2/2011 | Müller et al. | 455/456.1 |
| 2011/0090081 A1* | 4/2011 | Khorashadi et al. | 340/539.13 |
| 2012/0122484 A1 | 5/2012 | Marchenko et al. | 455/456.1 |

FOREIGN PATENT DOCUMENTS

| | | |
|---|---|---|
| DE | 102006041936 A1 | 3/2008 |
| DE | 102008021614 A1 | 7/2009 |
| WO | 2010/059934 A2 | 5/2010 |
| WO | 2011/006998 A1 | 1/2011 |

OTHER PUBLICATIONS

Park, S., et al., "Round Trip Time-Based Wireless Positioning without Time Synchronization", Int'l Conference on Control, Automation and Systems, pp. 2323-2326, Oct. 17, 2007.

Bahillo, A., et al., "IEEE 802.11 Distance Estimation Based on RTS/CTS Two-Frame Exchange Mechanism", 2009 IEEE 69$^{th}$ Vehicular Technology Conference, 5 pages, Apr. 26, 2009.

International PCT Search Report and Written Opinion, PCT/EP2010/060343, 12 pages, Oct. 13, 2010.

* cited by examiner

METHOD FOR CALIBRATING A PROPAGATION-TIME-BASED LOCALIZATION SYSTEM

CROSS-REFERENCE TO RELATED APPLICATIONS

This application is a U.S. National Stage Application of International Application No. PCT/EP2010/060343 filed Jul. 16, 2010, which designates the United States of America, and claims priority to DE Patent Application No. 10 2009 033 603.6 filed Jul. 17, 2009. The contents of which are hereby incorporated by reference in their entirety.

TECHNICAL FIELD

The invention relates to a method for calibrating a propagation-time-based localization system and to a corresponding localization system.

BACKGROUND

Various methods and systems devised for localizing mobile objects and based on wirelessly transmitted signals are known from the prior art. In particular there are field-strength-based methods in the case of which a mobile object's location is determined using the field strength of radio signals or sound signals exchanged between the mobile object and different base stations. Known furthermore are what are termed propagation-time-based methods in the case of which an object's position is ascertained using propagation times of signals between respective base stations and the object.

Localization systems have to be appropriately calibrated to enable positions to be determined accurately. Calibrating is therein usually performed by taking the mobile object to a multiplicity of known positions and measuring the corresponding field strengths at the respective position. That will yield a map of corresponding measured field strengths at a multiplicity of points, with its then being possible to ascertain the position during localizing by comparing the current measurements with the corresponding values from the map. Such manual calibrating methods are intricate and have to be carried out by experts because the mobile object has to be put into predetermined positions during calibrating. Automatic calibrating methods are also known from the prior art, but said methods are very intricate and employ complex algorithms.

SUMMARY

According to various embodiments, a simple and quickly performed method for calibrating a propagation-time-based localization system can be provided.

A method for the computer-supported calibrating of a propagation-time-based localization system, wherein the position of a mobile object in a predetermined environment can be determined in the localization system by registering propagation-time-based variables of a plurality of base stations belonging to a radio network, with the propagation-time-based variable of a respective base station representing the propagation time of signals between a radio unit belonging to the mobile object and the respective base station, may comprise: a) the mobile object being moved within the predetermined environment and the propagation-time-based variables of the respective base stations therein being registered at a plurality of measuring instants; b) the minimum value of the propagation-time-based variables of a respective base station being assigned to a predefined minimum distance of the mobile object from the respective base station and the maximum value of the propagation-time-based variables of a respective base station being assigned to a predefined maximum distance of the mobile object from the respective base station; c) for a respective base station a predefined dependence between the distances of the mobile object from the respective base station and the propagation-time-based variables of the respective base station being scaled to the assigning of the minimum value to the minimum distance and of the maximum value to the maximum distance, with the scaled dependence serving to ascertain the distances of the mobile object from the base stations from the propagation-time-based variables when its position is being determined.

According to a further embodiment, the predefined dependence can be a functional dependence having one or more free parameters, with the free parameters being matched during scaling to the assignment of the minimum value to the minimum distance and of the maximum value to the maximum distance. According to a further embodiment, the predefined dependence can be linear and/or logarithmic and/or is represented by a polynomial. According to a further embodiment, the propagation-time-based variables of at least three base stations can be registered. According to a further embodiment, the propagation-time-based variables may correspond in each case to the length of time elapsing between the transmitting of a request signal by the respective base station to the radio unit belonging to the mobile object and the reception at the respective base station of a response signal transmitted by the radio unit in response to the request signal. According to a further embodiment, the radio network can be based on a WLAN standard or an RFID standard. According to a further embodiment, calibrating can be performed iteratively while the object is being moved, with the plurality of measuring instants being at each iteration step augmented by the measuring instants that have been added since the last iteration step and, based on the resulting new plurality of measuring instants, step b) being carried out, and at least if there has been a change to the minimum value and/or maximum value compared with the last iteration step, step c) being carried out.

According to another embodiment, a method for the computer-supported localizing of a mobile object by means of a propagation-time-based localization system, with the localization system can be calibrated by means of a method as described above and the scaled dependence that is determined during calibrating can be used while the position of the mobile object is being determined for ascertaining the distances of the mobile object from the base stations from the propagation-time-based variables.

According to a further embodiment of the above method, the localization system can be calibrated iteratively while the object is being moved, with the plurality of measuring instants being at each iteration step augmented by the measuring instants that have been added since the last iteration step and, based on the resulting new plurality of measuring instants, step b) being carried out, and at least if there has been a change to at least one of the minimum value and maximum value compared with the last iteration step, step c) being carried out, with the position of the mobile object being determined during calibrating for at least a part of the measuring instants with the aid of the scaled dependence determined at the current iteration step.

According to yet another embodiment, a method for the computer-supported calibrating of a propagation-time-based localization system, wherein the position of a mobile object in a predetermined environment can be determined in the localization system by registering propagation-time-based variables of a plurality of base stations belonging to a radio network, with the propagation-time-based variable of a respective base station representing the propagation time of signals between a radio unit belonging to the mobile object and the respective base station, may comprise:—the mobile object being moved to a predefined position within the predetermined environment, with the distances of the mobile object from the base stations at the predefined position being known and at least in part different;—the propagation-time-based variables of the respective base stations being registered at the predefined position;—a dependence between the distances of the mobile object from a respective base station and the propagation-time-based variables of the respective base station being ascertained based on the registered propagation-time-based variables and the known distances of the mobile object from the respective base stations, with the dependence serving to ascertain the distances of the mobile object from the base stations from the propagation-time-based variables when its position is being determined.

According to a further embodiment of the above method, the dependence can be an approximated function that passes through the registered propagation-time-based variables at the known distances of the mobile object from the respective base stations. According to a further embodiment of the above method, the propagation-time-based variables of at least three base stations can be registered. According to a further embodiment of the above method, the propagation-time-based variables may correspond in each case to the length of time elapsing between the transmitting of a request signal by the respective base station to the radio unit belonging to mobile object and the reception at the respective base station of a response signal transmitted by the radio unit in response to the request signal. According to a further embodiment of the above method, the radio network can be based on a WLAN standard or an RFID standard.

According to yet another embodiment, in a method for the computer-supported localizing of a mobile object by means of a propagation-time-based localization system, the localization system can be calibrated by means of the method described above and the dependence that is determined during calibrating can be used while the position of the mobile object is being determined for ascertaining the distances of the mobile object from the base stations from the propagation-time-based variables.

According to yet another embodiment, a localization system may comprise a registering and evaluating device by means of which the position of a mobile object in a predetermined environment can be determined by registering propagation-time-based variables of a plurality of base stations belonging to the radio network, with the propagation-time-based variable of a respective base station representing the propagation time of signals between a radio unit belonging to the mobile object and the respective base station, with the registering and evaluating device being embodied such that any of the methods described above can be executed therewith.

BRIEF DESCRIPTION OF THE DRAWINGS

Exemplary embodiments are described in detail below with the aid of the attached figures, in which.

DETAILED DESCRIPTION

Figure 1:
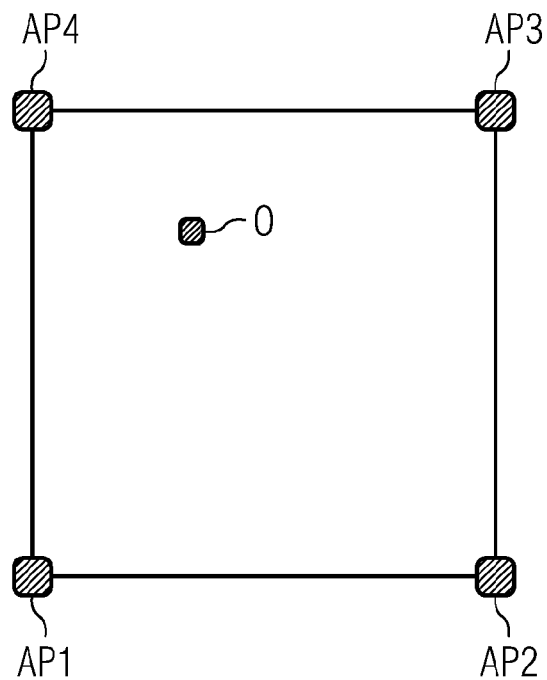
FIG. 1 is a top view of an environment that has a plurality of base stations and in which localizing can be performed according to an embodiment.

In the method according to various embodiments a localization system is calibrated in the case of which a mobile object's position in a predetermined environment can be determined by registering propagation-time-based variables of a plurality of base stations belonging to a radio network. A respective base station's propagation-time-based variable therein represents the propagation time of signals between a radio unit belonging to the mobile object and the respective base station. The propagation-time-based variable is hence a variable which can be the propagation time itself or, as the case may be, a variable that depends on said propagation time. "Base station" is therein a term having a broad meaning and includes, in a radio network, any radio unit having a stationary arrangement at a fixed position while the mobile object is being localized. What is to be understood by the term "radio unit" within the meaning of the invention is a transmitting and/or receiving unit in the corresponding radio network.

The localization system requiring to be calibrated according to various embodiments can be used for determining a mobile object's position both two-dimensionally and three-dimensionally. Although the predetermined environment in which localizing takes place can be variously embodied it ought preferably to be convex. For example the predetermined environment can in the case of two-dimensional localizing be rectangular and in the case of three-dimensional localizing be cuboidal. The individual base stations are in a variant furthermore located on the edge of the predetermined environment.

In a first variant, the mobile object is moved within the predetermined environment at a step a), with the respective base stations' propagation-time-based variables being registered at a plurality of measuring instants while the object is being moved. The mobile object's positions at the respective measuring instants do not therein have to be known. The minimum value of a respective base station's propagation-time-based variables is therein assigned at a step b) to a predefined minimum distance of the mobile object from the respective base station. The maximum value of a respective base station's propagation-time-based variables is analogously also assigned to a predefined maximum distance of the mobile object from the respective base station. What minimum or, as the case may be, maximum distances a mobile object can occupy from the individual base stations when it is moved within the environment are hence known in advance in the method from the predetermined environment.

For a respective base station, a predefined dependence between the mobile object's distances from the respective base station and the respective base station's propagation-time-based variables is at a step c) in the method according to various embodiments scaled to the assigning of the minimum value to the minimum distance and of the maximum value to the maximum distance performed at step b). That means an (unscaled) dependence will exist in advance in the method between the distances and the propagation-time-based variables, with said dependence being matched according to various embodiments such as to deliver the propagation-time-based variable's correspondingly assigned minimum value at the minimum distance and the propagation-time-based variable's correspondingly assigned maximum value at the maximum distance. The thus determined scaled dependence will then serve to ascertain the mobile object's distances from the base stations from the propagation-time-based variables when its position is being determined.

Use is made according to various embodiments of the knowledge that a curve exists that is independent of the current localization environment and describes the correlation between the mobile object's distance from a base station and the propagation-time-based variable. That predefined dependence can therein be determined in advance for each base station, for example as early as when the base station is being fabricated. Appropriately scaling said dependence will then make simple calibrating possible for which the mobile object's position at the measuring instants at which the propagation-time-based variables are registered will not have to be known.

The predefined dependence is in an embodiment variant defined as a functional dependence having one or more free parameters, with the free parameters being matched during scaling to the minimum value's assignment to the minimum distance and the maximum value's assignment to the maximum distance. For example the dependence can be described by a line equation in which the slope and offset in the direction of the ordinate are not known. With the aid of the corresponding maximum and minimum distance's assignment to the corresponding maximum and minimum values it will then be possible to ascertain the slope and offset, from which a clear line equation will be obtained that will then constitute a scaled dependence within the meaning of various embodiments.

The predefined dependence between the distances and a respective base station's propagation-time-based variables can be embodied in any way; it can in particular be linear and/or logarithmic and/or represented by a polynomial. The dependence can, for example, have been determined from a plurality of measured propagation-time-based variables at a mobile object's known distances from a base station by approximating a function to the measured values, for example through interpolation.

The propagation-time-based variables of at least three base stations are preferably registered to ensure accurate and clear position determining by means of the method according to various embodiments. The greater the number of base stations employed in the method, the more accurate the method will become, and the measured propagation-time-based variables can where applicable be checked for mutual plausibility.

What is used as a propagation-time-based variable in another embodiment variant is the round-trip time of signals from the base station to the mobile object's radio unit and from there back to the base station. That means a propagation-time-based variable corresponds to the length of time elapsing between the transmitting of a request signal by the respective base station to the mobile object's radio unit and the reception at the respective base station of a response signal transmitted by the radio unit in response to the request signal.

Any known standards can be used for the radio network in the method according to various embodiments. For example the radio network can be based on a WLAN standard, which is to say on a standard from the IEEE 802.11 family, or on an RFID standard (RFID=Radio Frequency Identification). In the case of the last-cited standard a base station is in particular a corresponding reading device that transmits signals to and receives them from an RFID transponder on the mobile object.

In an embodiment, calibrating is performed iteratively while the object is being moved, with the plurality of measuring instants being at each iteration step augmented by the measuring instants that have been added since the last iteration step and have correspondingly registered propagation-time-based variables and, based on the resulting new plurality of measuring instants, above-described steps b) and c) being carried out, with step c) being in particular carried out only if there is a new minimum or, as the case may be, maximum value compared with the last iteration step. It may, though, also be possible initially for only the corresponding propagation-time-based variables to be measured while the mobile object is being moved in the predetermined environment and steps b) and c) not to be carried out until afterwards, based on the propagation-time-based variables.

Apart from the above-described calibration method, a method for localizing a mobile object by means of a propagation-time-based localization system can be provided, with the localization system being calibrated by means of the method according to various embodiments and the scaled dependence that is determined during calibrating being used while the mobile object's position is being determined for ascertaining the mobile object's distances from the base stations from the propagation-time-based variables. The position is therein determined by means of, for instance, multi-lateration (for example trilateration) based on the mobile object's ascertained distances from the base stations. The method for position determining described in German patent application No. 10 2008 004 257.9 or in PCT application PCT/EP2008/068162 can also be used. The entire disclosure of the two patent applications is rendered by referring to the content of the present application. Said method is preferably combined with the above-described iterative calibration method in such as way that the mobile object's position will during calibrating be determined for at least a part of the measuring instants with the aid of the scaled dependence determined at the current iteration step. Localizing can in that way also be carried out simultaneously in parallel with calibrating.

According to a second variant calibrating at a predefined position within the predetermined environment can be provided. The mobile object is therein moved to the predefined position in the environment, with the mobile object's distances from the base stations at the predefined position being known and at least in part different. The respective base stations' propagation-time-based variables are therein registered at the predefined position. A dependence between the mobile object's distances from a respective base station and the respective base station's propagation-time-based variables is finally ascertained based on the mobile object's registered and known distances from the respective base stations, with the dependence serving to ascertain the mobile object's distances from the base stations from the propagation-time-based variables when its position is being determined.

That variant has the particular advantage of being able to achieve simple calibrating with just one measuring operation at a single pre-known position. It is assumed in said variant that the individual base stations have the same characteristics in terms of an identical dependence between the mobile object's distances from the base station and the propagation-time-based variables. A single dependence can in that way be ascertained for a plurality of different distances through measured propagation-time-based variables of different base stations. The dependence is therein preferably a function that has been determined by means of approximation (interpolation, for instance) and passes through the registered propagation-time-based variables at the mobile object's known distances from the respective base stations.

Analogously to the first variant, at least three base stations are preferably used for localizing in the second variant also. In particular the round-trip times of signals from the base station to the mobile object and back are used likewise as propagation-time-based variables. A radio network based on a WLAN standard or RFID standard is preferably also used as the radio network.

Apart from the calibration method just described according to a second variant, furthermore a method for localizing a mobile object can be provided, with the localization system being calibrated using the method just described and the dependence determined during calibrating being used to ascertain the mobile object's distances from the base stations from the propagation-time-based variables when its position is being determined.

Apart from the above-described methods, a localization system can be provided having a registering and evaluating unit, with its being possible to determine the mobile object's position in a predetermined environment by means of the registering of propagation-time-based variables of a plurality of base stations belonging to a radio network, with a respective base station's propagation-time-based variable representing the propagation time of signals between a radio unit belonging to the mobile object and the respective base station. The registering and evaluating device is therein embodied such that the method according to any of the above-described variants can be executed therewith.

Described below are embodiment variants using the example of a localizing system for determining a mobile object's position two-dimensionally in a closed environment inside a building. FIG. 1 is a top view of an example of an environment of such kind in the form of a square room or, as the case may be, a square hall. The environment shown in FIG. 1 can be, for example, a car park inside a building and the length of the square environment's sides can be, for example, 100 m. A base station belonging to a radio network is provided in each corner of the environment. Said base stations have been assigned the reference numerals/letters AP1, AP2, AP3, and AP4 in FIG. 1. The base stations are stationary in the environment and transmit or, as the case may be, receive signals conforming to a radio standard. In particular standards on the MAC layer of the OSI reference model are therein possible candidates for the radio standard, for example a WLAN or, as the case may be, RFID standard. Any other standards can where applicable also be realized. What is more decisive is that the range of the base stations' signals is such that they can be received by mobile objects within the environment.

Shown further schematically in the scenario in FIG. 1 is a mobile object O that is moving within the environment and has a corresponding radio unit that operates according to the same standard as base stations AP1 to AP4. The mobile object can therein be, for example, a portable device (a PDA or a mobile telephone, for instance) that has a corresponding wireless interface for communicating with the base stations. The mobile object can move anywhere within the square environment. For implementing the method the environment's dimensions are known so that the mobile object's maximum distance from each of the base stations can be computed in advance. The mobile object's smallest distance from each of the base stations is likewise known, with its being possible to assume, for example, that said distance is typically between 1 and 2 m because the base stations are usually installed at a height of approximately 2 to 3 m from the floor.

Figure 2:
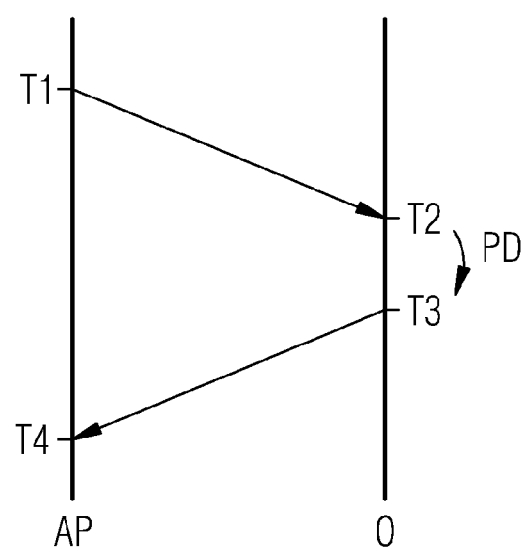
FIG. 2 is a schematic illustrating the determining of a propagation-time-based variable according to an embodiment.

In a first variant, the mobile object moves continuously within the predetermined environment and propagation-time-based variables based on the signals of the base stations or, as the case may be, of the mobile object's radio unit are therein ascertained at regular intervals. A localization system for determining the object's position within the environment can then be calibrated with the aid of said variables, as will be described in yet further detail below. What is measured as the propagation-time-based variable for the individual base stations in the embodiment variants described here is what is termed the "round-trip time" (referred to below also as RTT), which is determined based on a ping-pong process that is shown schematically in FIG. 2. The time axis is therein plotted in the vertical direction in FIG. 2, with the left-hand vertical line AP illustrating the events at one of the base stations and the right-hand vertical line O illustrating the events at the mobile object. For determining the round-trip time, at instant T1 a base station emits a data packet that is received by the mobile object's radio unit at instant T2. The data packet therein constitutes a request packet which is used in the corresponding radio standard and is answered by the mobile object with a response packet in the form of an acknowledgement. Until the response packet is emitted, the mobile object requires a predetermined processing time referred to in FIG. 2 as PD (PD=processing delay). After processing, the response packet will then be emitted by the mobile object's radio unit at instant T3 and will be received at the corresponding base station at instant T4. The round-trip time RTT=T4−T1 can then be ascertained by means of corresponding timestamps in the packets. Because the signals travel at approximately the speed of light c, the distance d between the base station and mobile object can basically and under ideal conditions be determined as follows when the processing time PD is known:

$$d = c \cdot (T4 - T1 - PD)/2 \qquad (1)$$

The processing time PD is therein substantially longer than the signal's round-trip time. The processing time can furthermore depend very much on the specific hardware components used in the mobile object's radio unit. The processing time will in particular usually be different for different manufacturers' hardware components, and said time will vary even among different models from the same manufacturer. It is for that reason difficult to determine the distance between a mobile object and base station according to the above formula using standard hardware components. That disadvantage is eliminated in the method's embodiment variants described below through its not being necessary for the processing time PD to be known when the localization system is calibrated and a position then determined. All that is needed is for the round-trip time RTT to be registered as an input variable during calibrating or when the mobile object is being localized.

First described below for the method is a variant thereof in which calibrating and localizing of the mobile object are carried out simultaneously. It is therein assumed that the mobile object moves within the predetermined environment for a prolonged period and, while doing so, relative to each of the base stations once or more often assumes positions at which the distance from the respective base station is the maximum or, as the case may be, minimum distance. The corresponding round-trip times RTT are therein continuously measured from each of the base stations in keeping with the above ping-pong process while the mobile object is being moved. Compared with the prior art, it is therein advantageous that the mobile object's position within the environment does not have to be known during calibrating at the measuring instants at which the RTT is measured. Calibrating will consequently not have to be performed by specially trained people who move step by step through the predetermined environment and position themselves along with the mobile object at predetermined, known positions at which the respective RTT times will then be measured.

Rather it is the case that the mobile object can be given to any people who will move within the predetermined environment for a prolonged period, with calibrating proceeding automatically without the person concerned having to be informed about it at all.

For turning the method to practical account, use is made of the fact that a functional dependence exists between the mobile object's distance from the respective base station and the round-trip time RTT. Said dependence is known in advance. It does not therein depend on the environment in which the base stations have been installed and can be ascertained in advance for example in the factory in which the base stations are manufactured. The corresponding dependence can therein be different for each of the individual base stations. A linear dependence, for example, can in particular be assumed between the mobile object's distance d from the base station and the corresponding round-trip time RTT (see equation (1)). To achieve more accurate results the dependence should, though, be modeled better since the round-trip time has proved in practice not always to behave linearly owing to signal reflections. There will be a logarithmic dependence between the distance d and time RTT particularly when the base stations operate according to the RFID standard.

Figure 3:
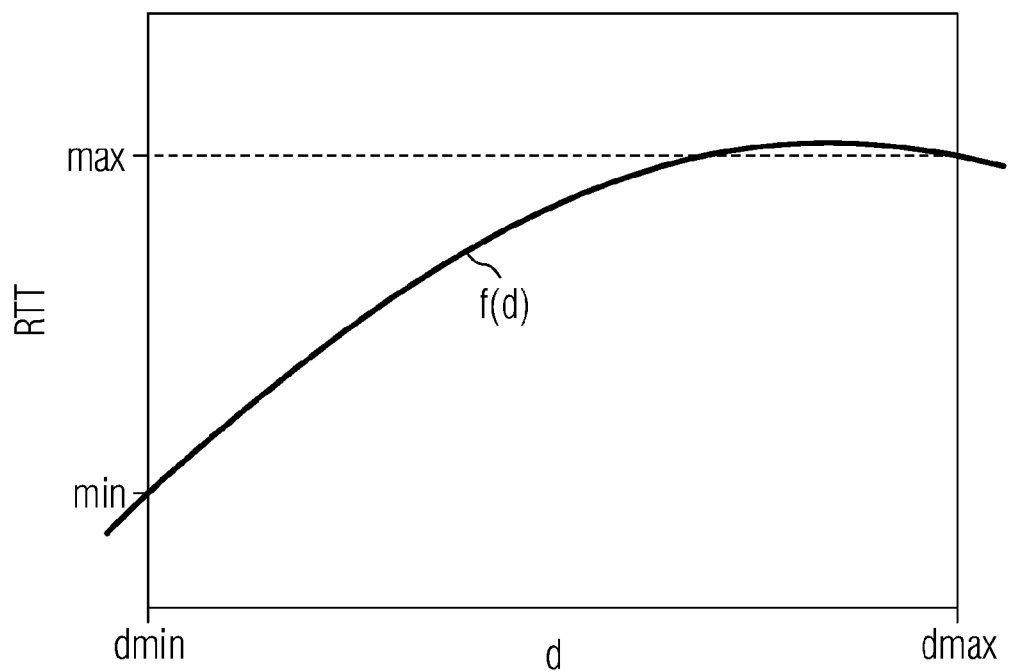
FIG. 3 is a chart showing an example of a dependence between a base station's distances from a mobile object and the propagation-time-based variables.

FIG. 3 shows an example of a dependence of the round-trip time RTT on a mobile object's distance d from a base station. The distances d are therein the distances within the corresponding two-dimensional environment in which the object is moving. There is a minimum distance dmin and a maximum distance dmax, with its being possible to assume dmin=0 m and dmax=100 m in the scenario in FIG. 1. The corresponding propagation times at position dmin and dmax are referred to in FIG. 3 as min and max. The curve of the propagation time RTT as a function of the distance d is referred to as f(d). In the variant described here an unscaled functional dependence between d and RTT is known for each base station when calibrating starts, meaning that f(d) exists as a function with a plurality of parameters that are still undetermined or, as the case may be, require matching. If one considers, for example, a linear dependence, then what applies is f(d)=a·d+b, with parameters a and b not yet having been determined or, as the case may be, scaled and being ascertained during calibrating that is described in the following. f(d) can also be embodied in any other way, for example it can be a polynomial that has been ascertained by interpolating performed measurements in advance for determining the functional correlation between d and RTT. As already mentioned above, the functional correlation between d and RTT can be described also by a logarithmic function.

Mobile object O moves within the predetermined environment during calibrating. The round-trip time RTT is therein registered for each of the base stations at a multiplicity of measuring instants and the minimum and maximum value of the round-trip times is continuously selected from the registered values. The functional dependence f(d) is then appropriately scaled based on the current minimum and maximum values. Scaling is therein performed in such as way that the minimum value of the round-trip time RTT occurs at the minimum distance dmin and the maximum value of the round-trip time RTT occurs at the maximum distance dmax, with the minimum and maximum distance being predefined by the predetermined environment. So free parameters of the function f(d) are correspondingly determined, as a result of which a fixed function matched to the specific application is obtained for describing the dependence between d and RTT. In the above instance of a linear dependence, parameter b corresponds therein to the minimum value min and parameter a corresponds to the value (max−min)/(dmax−dmin).

Figure 4:
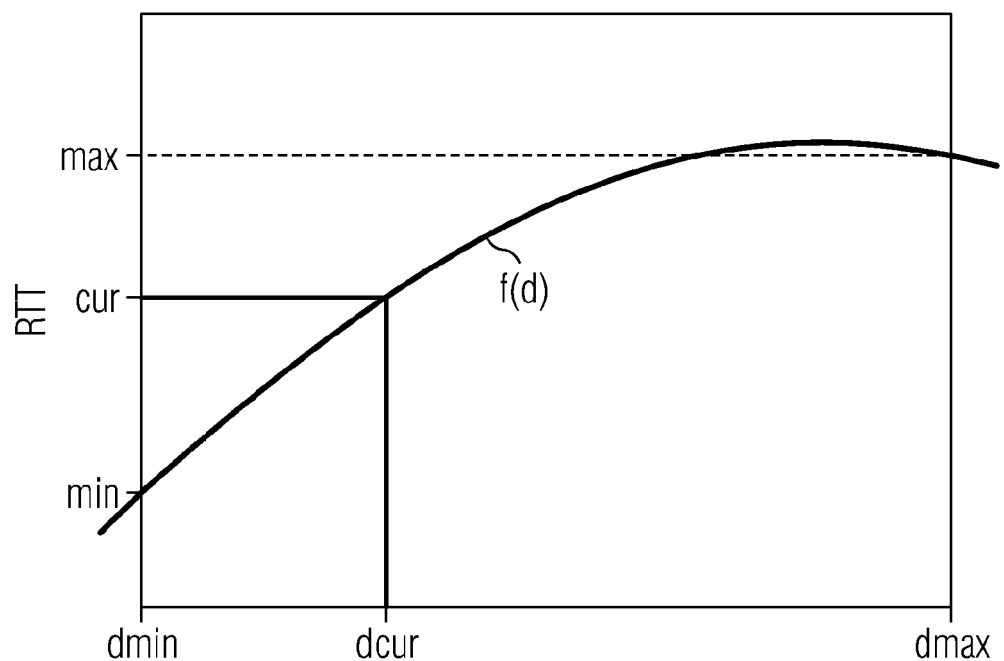
FIG. 4 is a chart analogous to FIG. 3 in which the determining of a current position of a mobile object is illustrated.

The mobile object's current position is ascertained when the function f(d) has been determined based on the current minimum and maximum value of RTT, which is illustrated in the chart in FIG. 4. Based on the current value cur of the propagation time RTT, the momentary distance dcur between the mobile object and the base station currently under consideration is then determined based on the currently present function f(d). That is done by determining the point of intersection of the horizontal line proceeding from the value cur by means of the function f(d) and ascertaining the corresponding value dcur along the abscissa for said point of intersection. What will be achieved in that way continuously while the object is being moved is, on the one hand, calibrating through corresponding scaling of the function f(d) and, on the other, position determining, with position determining becoming increasingly better the longer the object moves within the environment because it will be ensured thereby that the object will actually have occupied positions having a minimum and maximum distance from the respective base stations.

To summarize, above-described calibrating and simultaneous localizing of a mobile object proceeds in such a way that the object moves to different unknown positions, with the propagation times RTT being registered with reference to each base station for every new unknown position. The newly registered values are then compared with the current values for the minimum and maximum propagation time. If the current value of the RTT for a base station is less than the current minimum value, the minimum value will be replaced with the new current value. If the current value of the RTT for a base station is greater than the current maximum value, the maximum value will be replaced with the current value. If the minimum or, as the case may be, maximum value is replaced in such a manner, the functional dependence f(d) will thereupon also be suitably matched to the new minimum or, as the case may be, maximum value. The current position is finally also estimated based on the function f(d), as was described with the aid of the example shown in FIG. 4. An estimation of the mobile object's distances from each base station will hence be obtained during calibrating. All the base stations' data is then assembled in a processing unit, for example a central server to which each base station's data is conveyed. The mobile object's position is finally determined there by means of suitable algorithms known from the prior art, by means in particular of multilateration (for example trilateration).

Figure 5:
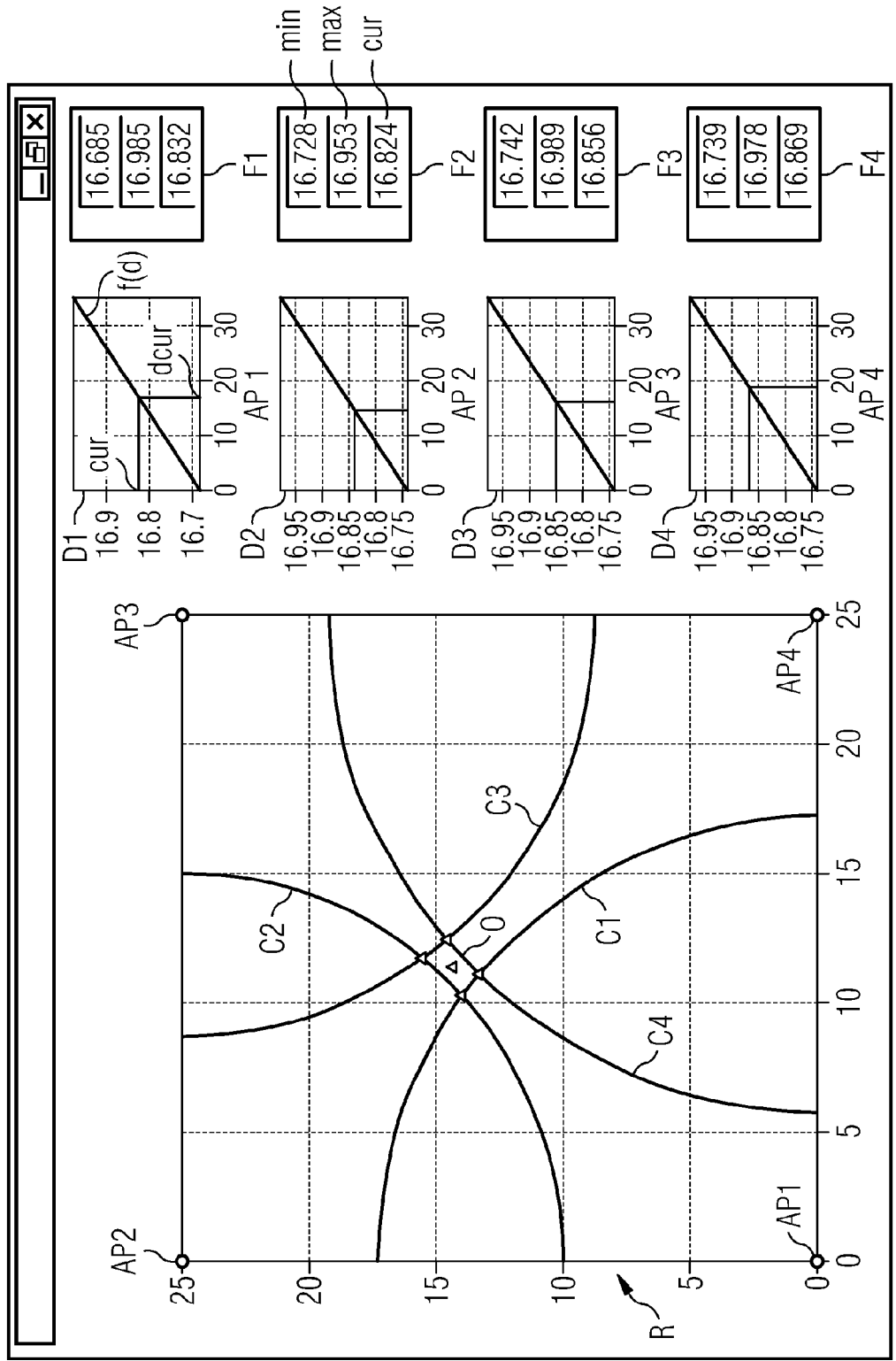
FIG. 5 shows a user interface which in an embodiment of a localizing system visualizing the determining of a mobile object's position for a user.

FIG. 5 shows an example of a user interface on which the results of calibrating or, as the case may be, position estimating are conveyed visually to the user. The reference numerals/letters shown are therein not part of the user interface. The predetermined environment under consideration in which object O is moving is indicated as a square area R on the user interface that is displayed on a monitor. Considered therein is a square area the length of whose sides is 25 m. Located in each corner of said area is a corresponding base station AP1, AP2, AP3, or AP4. The currently ascertained position of object O is indicated to the user by a small triangle inside square area R.

Contained in the user interface apart from square area R are corresponding charts D1, D2, D3, and D4 conveying the currently ascertained functional dependence between the respective base station's distance d and the propagation time RTT. Chart D1 relates therein to base station AP1, chart D2 to base station AP2, chart D3 to base station AP3, and chart D4 to base station AP4. The distance d is indicated along the abscissa in a respective chart and the propagation time RTT along the ordinate. The individual charts contain the function f(d) and hence correspond to embodiment variants of the chart shown in FIG. 4 with, though, in contrast to FIG. 4 a linear dependence between the distance d and propagation time RTT now being assumed. The individual functions were—as described above—determined based on the assumption of a linear dependence and through scaling based on the currently present minimum and maximum values for RTT of the respective base station. Based on the respective functions, the mobile object's current distance dcur from the relevant base station was furthermore determined from the current value cur for the propagation time RTT. The variables f(d), cur, and dcur are for reasons of clarity indicated by means of corresponding reference letters only in top chart D1. Corresponding fields F1 to F4 are furthermore indicated next to respective charts D1 to D4. Each of the fields therein contains three values, with the topmost value indicating the minimum value min for RTT, the middle value indicating the maximum value max for RTT, and the bottom value indicating the current value cur for RTT. The corresponding values have been assigned the corresponding reference letters only in field F2 for reasons of clarity.

The correspondingly ascertained distances dcur for each base station are furthermore shown in square area R by means of segments of a circle C1, C2, C3 or, as the case may be, C4 having their center point around the position of respective base stations AP1, AP2, AP3 or, as the case may be, AP4. The position of object O is then determined using the methods known from the above-cited German patent application having the No. 10 2008 004 257.9 or, as the case may be, from PCT application PCT/EP2008/068162, with said position having been suitably averaged in the embodiment variant shown in FIG. 5 so that the position will lie in the center of the trapezoid region formed by the points of intersection between the individual segments of a circle C1 to C4. Individual circles C1 to C4 would ideally (which is to say when a position is estimated without any measuring errors) intersect at a single point.

The method's variant just described has a number of advantages. In particular, simple automated calibrating of a localization system is provided that can be performed far more economically than conventional calibrating. That is because less time is needed for calibrating as the object no longer has to be moved into fixed positions known in advance. Substantial cost savings can therein be achieved by means of the calibrating method because calibrating accounts for a very large portion of a localization system's TCO costs (TCO=Total Costs of Ownership). It is moreover no longer necessary for calibrating to be performed by experts; instead, any person will be able to carry the mobile object around within the predetermined environment, with calibrating then being performed without any user intervention through the registering of corresponding propagation times RTT. It must therein only be ensured that the user moves over a large region of the predetermined environment during calibrating. Using the above-described calibrating method will make it possible to dispense with costly recalibrating because the calibrating process can run continuously in the background and will therefore automatically adjust to new ambient conditions.

It can be furthermore shown that good results can be obtained using the method's above-described embodiment variant both in conditions in which the object is in the line of sight with the base stations and in conditions in which the object is not in the line of sight with the base stations. It was further established that in the case of a propagation-time measurement with no line of sight between the base station and object, the consequent measuring error resulting in a greater than actual distance will often be canceled out by further propagation-time measurements of other base stations with no line of sight in other directions. It will on average hence be possible to ascertain the mobile object's correct position very well within the predetermined environment.

Described below is a simplified further variant of the method for calibrating a localization system. It is assumed therein that all the base stations in the system have the same characteristics, meaning that for all base stations there is the same dependence based on a corresponding function f(d), which is initially unknown. Calibrating is in that case performed by arranging the mobile object at a known position within the predetermined environment at which the distances from the individual base stations are known and are different. A scenario of such kind is shown also in FIG. 1. Mobile object O has according to said figure different distances from each of base stations AP1 to AP4. Calibrating therein takes place in such a way that the mobile object will be arranged at the known position and the corresponding measured values of the propagation times RTT then ascertained. The individual measured values having the correspondingly known distances can then be entered in a chart along whose abscissa the object's distance d from the base station and along whose ordinate the ascertained propagation time RTT has been plotted. Because, as mentioned above, the base stations' characteristics are the same, by means of an approximation based on the measured values entered in the chart, particularly by means of an interpolation, it will then be possible to derive the corresponding function f(d) that is valid for all the base stations. When the object is moved, its corresponding distances from the base stations can then be registered by means of said function via the registered propagation times RTT. The object's position can then in turn be determined by means of multilateration based on said distances. The second variant just described has the particular advantage that calibrating can be performed only at a single predetermined position having known coordinates. Use is therein made of the knowledge that a predefined functional dependence exists between the mobile object's distances from a base station and the correspondingly registered propagation times RTT.

The second variant can where applicable be used also for predetermining determining the functional dependence between the distance and propagation time for a corresponding base station, with said functional dependence then being appropriately scaled using the above-described first variant of the method during calibrating.

What is claimed is:

1. A method for the computer-supported calibrating of a propagation-time-based localization system, wherein the position of a mobile object in a predetermined environment can be determined in the localization system by registering propagation-time-based variables of a plurality of base stations belonging to a radio network, with the propagation-time-based variable of a respective base station representing the propagation time of signals between a radio unit belonging to the mobile object and the respective base station, with the method comprising:
   a) moving the mobile object within the predetermined environment and registering the propagation-time-based variables of the respective base stations therein at a plurality of measuring instants;

b) assigning the minimum value of the propagation-time-based variables of a respective base station to a predefined minimum distance of the mobile object from the respective base station and the maximum value of the propagation-time-based variables of a respective base station to a predefined maximum distance of the mobile object from the respective base station;

c) for a respective base station, scaling a predefined dependence between the distances of the mobile object from the respective base station and the propagation-time-based variables of the respective base station to the assigning of the minimum value to the minimum distance and of the maximum value to the maximum distance, with the scaled dependence serving to ascertain the distances of the mobile object from the base stations from the propagation-time-based variables when its position is being determined.

2. The method according to claim 1, wherein the predefined dependence is a functional dependence having one or more free parameters, with the free parameters being matched during scaling to the assignment of the minimum value to the minimum distance and of the maximum value to the maximum distance.

3. The method according to claim 1, wherein the predefined dependence is at least one of linear, logarithmic, and represented by a polynomial.

4. The method according to claim 1, wherein the propagation-time-based variables of at least three base stations are registered.

5. The method according to claim 1, wherein the propagation-time-based variables correspond in each case to the length of time elapsing between the transmitting of a request signal by the respective base station to the radio unit belonging to the mobile object and the reception at the respective base station of a response signal transmitted by the radio unit in response to the request signal.

6. The method according to claim 1, wherein the radio network is based on a WLAN standard or an RFID standard.

7. The method according to claim 1, wherein calibrating is performed iteratively while the object is being moved, with the plurality of measuring instants being at each iteration step augmented by the measuring instants that have been added since the last iteration step and, based on the resulting new plurality of measuring instants, step b) being carried out, and at least if there has been a change to at least one of the minimum value and maximum value compared with the last iteration step, step c) being carried out.

8. A method for the computer-supported localizing of a mobile object by means of a propagation-time-based localization system, with the localization system being calibrated by a) moving the mobile object within the predetermined environment and registering the propagation-time-based variables of the respective base stations therein at a plurality of measuring instants;

b) assigning the minimum value of the propagation-time-based variables of a respective base station to a predefined minimum distance of the mobile object from the respective base station and the maximum value of the propagation-time-based variables of a respective base station to a predefined maximum distance of the mobile object from the respective base station;

c) for a respective base station, scaling a predefined dependence between the distances of the mobile object from the respective base station and the propagation-time-based variables of the respective base station to the assigning of the minimum value to the minimum distance and of the maximum value to the maximum distance, with the scaled dependence serving to ascertain the distances of the mobile object from the base stations from the propagation-time-based variables when its position is being determined; and using the scaled dependence that is determined during calibrating while the position of the mobile object is being determined for ascertaining the distances of the mobile object from the base stations from the propagation-time-based variables.

9. The method according to claim 8, wherein calibrating of the localization system is performed iteratively while the object is being moved, with the plurality of measuring instants being at each iteration step augmented by the measuring instants that have been added since the last iteration step and, based on the resulting new plurality of measuring instants, step b) being carried out, and at least if there has been a change tout least one of the minimum value and maximum value compared with the last iteration step, step c) being carried out, and wherein the position of the mobile object being determined during calibrating for at least a part of the measuring instants with the aid of the scaled dependence determined at the current iteration step.

10. A method for the computer-supported calibrating of a propagation-time-based localization system, wherein the position of a mobile object in a pre-determined environment can be determined in the localization system by registering propagation-time-based variables of a plurality of base stations belonging to a radio network, with the propagation-time-based variable of a respective base station representing the propagation time of signals between a radio unit belonging to the mobile object and the respective base station, with the method comprising:

moving the mobile object to a predefined position within the predetermined environment, wherein the distances of the mobile object from the base stations at the predefined position being known and at least in part different;

registering the propagation-time-based variables of the respective base stations at the predefined position;

ascertaining a dependence between the distances of the mobile object from a respective base station and the propagation-time-based variables of the respective base station based on the registered propagation-time-based variables and the known distances of the mobile object from the respective base stations, wherein the dependence serves to ascertain the distances of the mobile object from the base stations from the propagation-time-based variables when its position is being determined.

11. The method according to claim 10, wherein the dependence is an approximated function that passes through the registered propagation-time-based variables at the known distances of the mobile object from the respective base stations.

12. The method according to claim 10, wherein the propagation-time-based variables of at least three base stations are registered.

13. The method according to claim 10, wherein the propagation-time-based variables correspond in each case to the length of time elapsing between the transmitting of a request signal by the respective base station to the radio unit belonging to mobile object and the reception at the respective base station of a response signal transmitted by the radio unit in response to the request signal.

14. The method according to claim 10, wherein the radio network is based on a WLAN standard or an RFID standard.

15. A method for the computer-supported localizing of a mobile object by means of a propagation-time-based localization system, comprising:
- calibrating the localization system by:
  - moving the mobile object to a predefined position within the predetermined environment, wherein the distances of the mobile object from the base stations at the predefined position being known and at least in part different;
  - registering the propagation-time-based variables of the respective base stations at the predefined position;
  - ascertaining a dependence between the distances of the mobile object from a respective base station and the propagation-time-based variables of the respective base station based on the registered propagation-time-based variables and the known distances of the mobile object from the respective base stations, wherein the dependence serves to ascertain the distances of the mobile object from the base stations from the propagation-time-based variables when its position is being determined; and
- wherein the dependence that is determined during calibrating is used while the position of the mobile object is being determined for ascertaining the distances of the mobile object from the base stations from the propagation-time-based variables.

16. A localization system comprising a registering and evaluating device by means of which the position of a mobile object in a predetermined environment can be determined by registering propagation-time-based variables of a plurality of base stations belonging to the radio network, with the propagation-time-based variable of a respective base station representing the propagation time of signals between a radio unit belonging to the mobile object and the respective base station, with the registering and evaluating device being embodied such when the mobile object moves within the predetermined environment the propagation-time-based variables of the respective base stations therein are registered at a plurality of measuring instants; and wherein the registering and evaluation device assigns the minimum value of the propagation-time-based variables of a respective base station to a predefined minimum distance of the mobile object from the respective base station and the maximum value of the propagation-time-based variables of a respective base station to a predefined maximum distance of the mobile object from the respective base station; and wherein for a respective base station, a predefined dependence between the distances of the mobile object from the respective base station and the propagation-time-based variables of the respective base station is scaled to the assigning of the minimum value to the minimum distance and of the maximum value to the maximum distance, wherein the scaled dependence serving to ascertain the distances of the mobile object from the base stations from the propagation-time-based variables when its position is being determined.

17. The system according to claim 16, wherein the predefined dependence is a functional dependence having one or more free parameters, with the free parameters being matched during scaling to the assignment of the minimum value to the minimum distance and of the maximum value to the maximum distance.

18. The system according to claim 16, wherein the predefined dependence is at least one of linear, logarithmic, and represented by a polynomial.

19. The system according to claim 16, wherein the propagation-time-based variables of at least three base stations are registered.

20. The system according to claim 16, wherein the propagation-time-based variables correspond in each case to the length of time elapsing between the transmitting of a request signal by the respective base station to the radio unit belonging to the mobile object and the reception at the respective base station of a response signal transmitted by the radio unit in response to the request signal.

* * * * *